March 17, 1936.　　　R. W. BROWN　　　2,034,649
ACCELEROMETER
Filed Dec. 23, 1929　　　5 Sheets-Sheet 1

INVENTOR.
Roy W. Brown.
BY Ely & Barrow
ATTORNEYS.

March 17, 1936.  R. W. BROWN  2,034,649
ACCELEROMETER
Filed Dec. 23, 1929  5 Sheets-Sheet 2
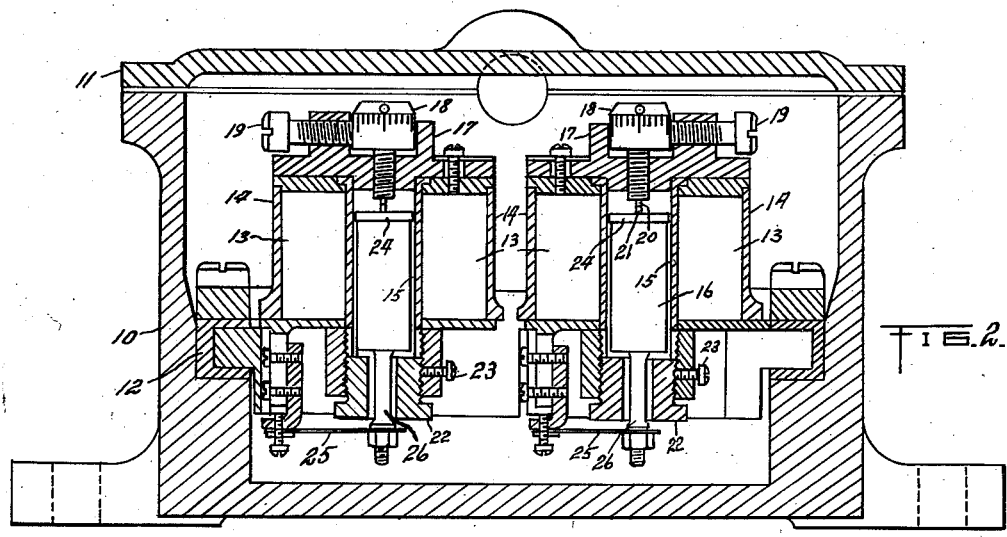
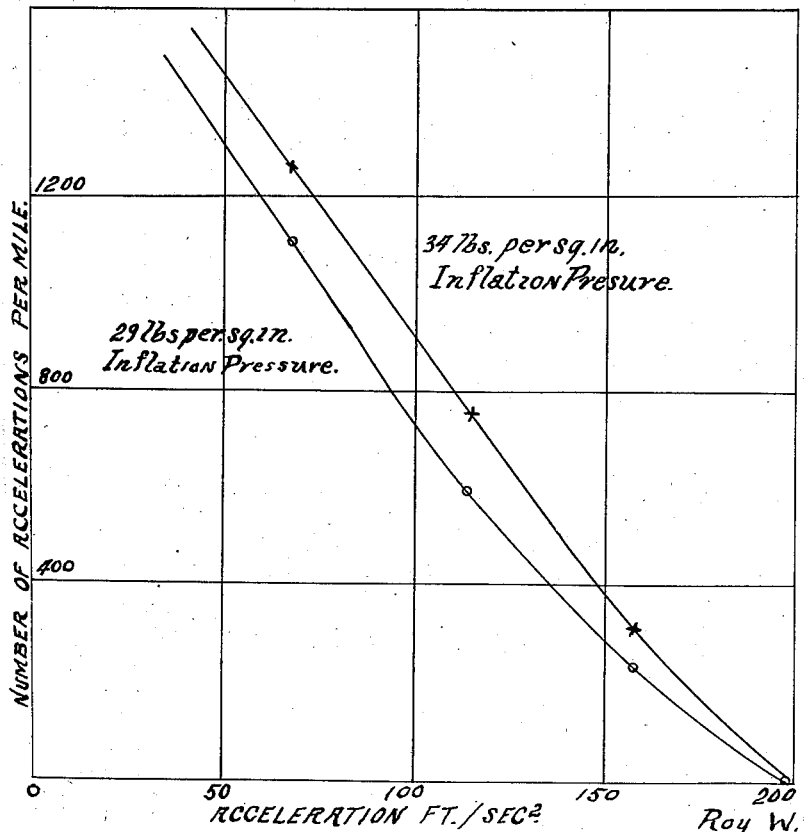
INVENTOR.
Roy W. Brown.
BY
ATTORNEYS.

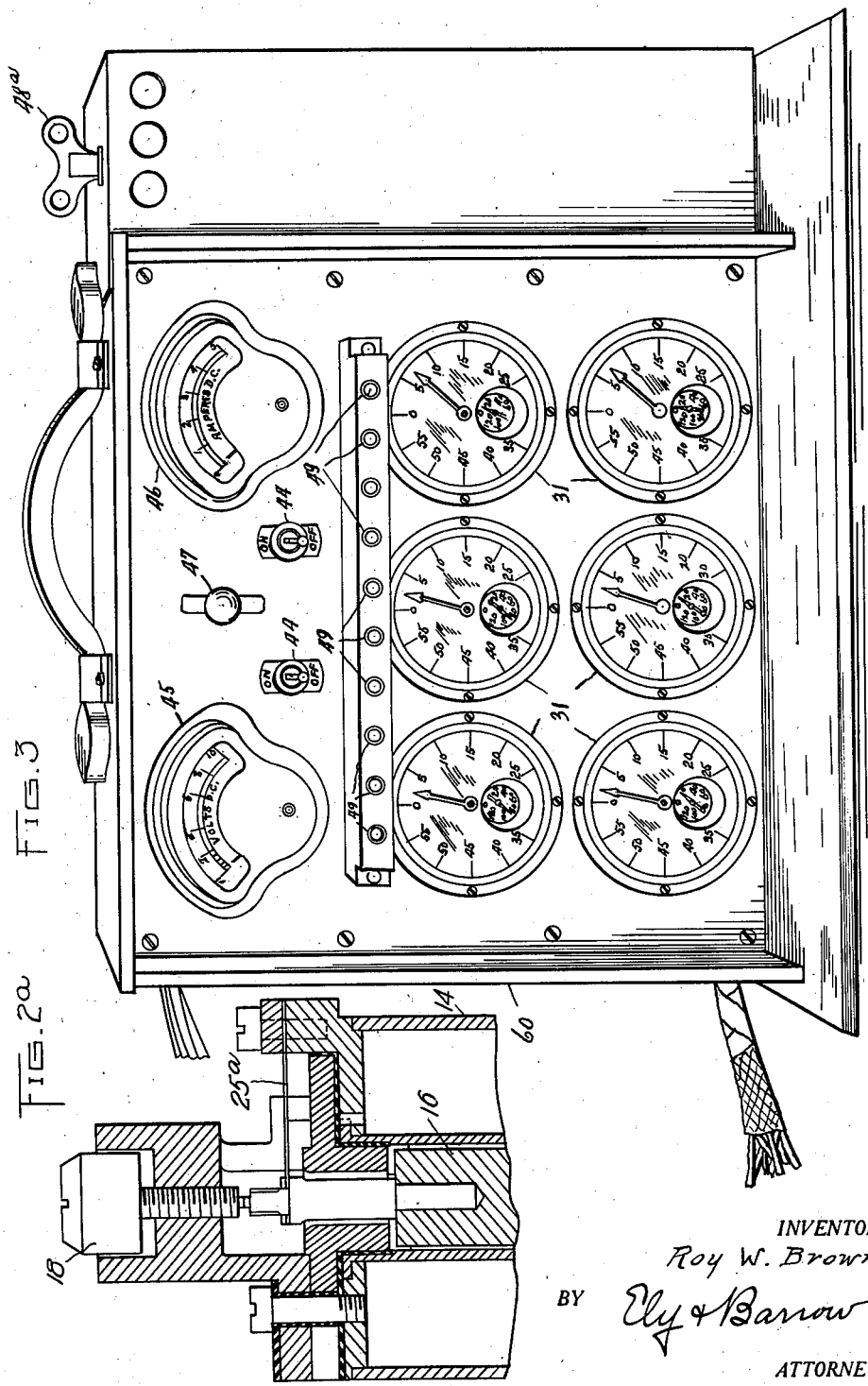

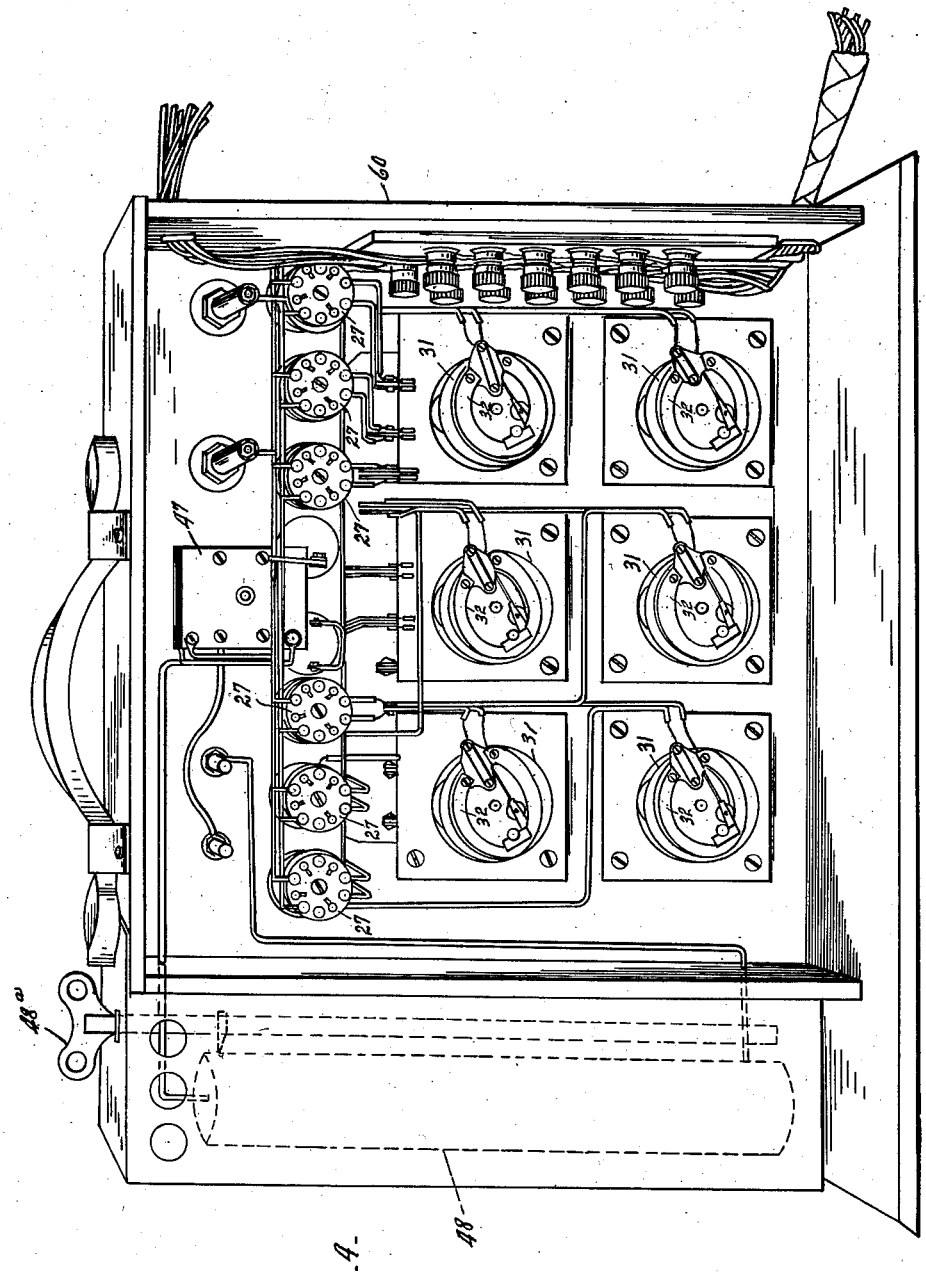

March 17, 1936.  R. W. BROWN  2,034,649
ACCELEROMETER
Filed Dec. 23, 1929   5 Sheets-Sheet 5
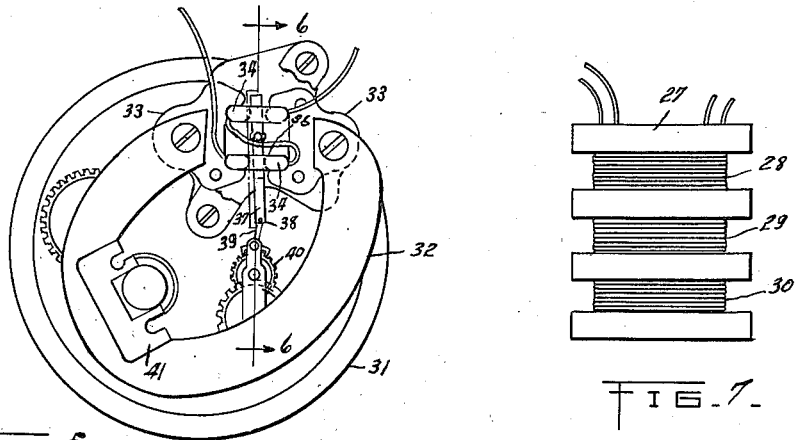
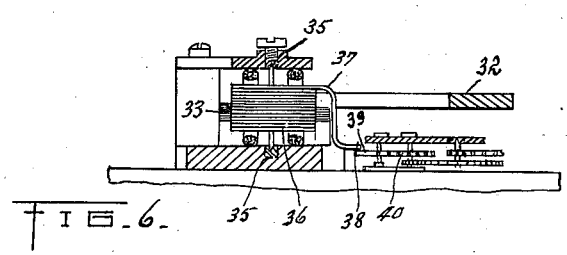
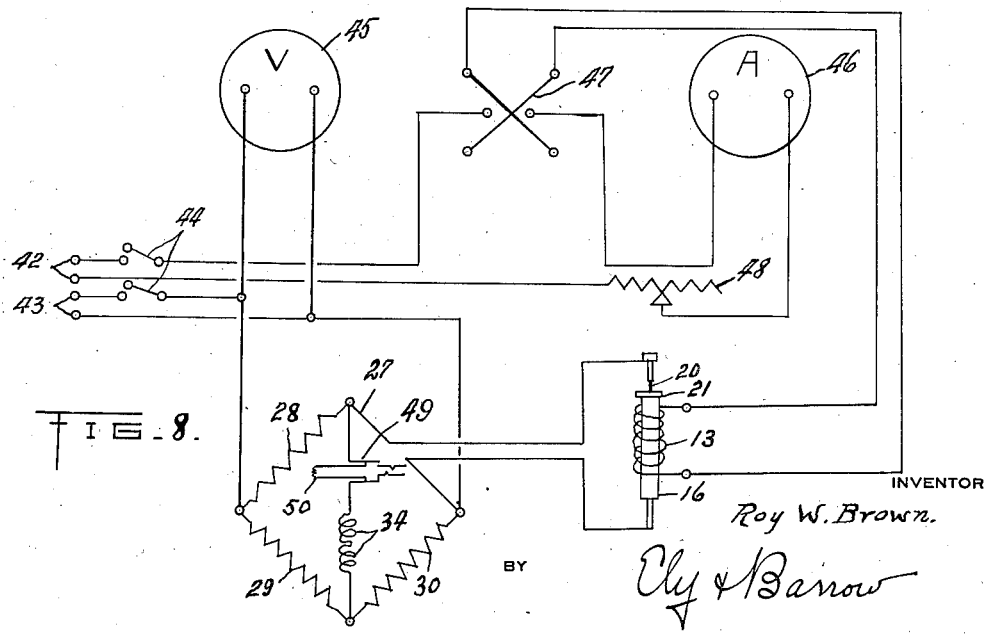
INVENTOR
Roy W. Brown.
BY
ATTORNEYS Patented Mar. 17, 1936

2,034,649

UNITED STATES PATENT OFFICE 2,034,649

ACCELEROMETER

Roy W. Brown, Akron, Ohio, assignor to The Firestone Tire and Rubber Company, Akron, Ohio, a corporation of Ohio Application December 23, 1929, Serial No. 416,178

6 Claims. (Cl. 177—311)

This invention relates to instruments for measuring shocks or accelerations imparted to bodies, particularly those occurring in moving vehicles.

The purpose of the invention is to devise means for determining the riding qualities of automobiles, railroad coaches and the like by measuring the frequency and intensity of the accelerations produced while the vehicle is in motion over its road-bed. Such an instrument is particularly valuable in determining the results obtained when it is attempted to reduce such shocks produced in a vehicle or other body by incorporating therein various kinds of shock absorbers, cushions, vibration insulators, or different types of springs or tires. The instrument embodying the invention is also adaptable for measuring accelerations in stationary bodies subject to vibration, such as engines or motors.

An object of the invention is to devise a simple, rugged and accurate accelerometer adapted to detect accelerations occurring within a definite intensity range. A further object is to devise means for measuring accelerations through a range of progressively greater intensities. Another object is to devise an accelerometer operable over a variable range of intensities. A still further object is to devise means for eliminating chattering in a contact type accelerometer.

Another object is to devise means for counting the accelerations detected by the contact element. Still another object is to devise a counter of sufficient speed to accurately count rapidly occurring accelerations such as those which are produced in a moving vehicle in road service, the counter being adapted to give the total of the accelerations of a given intensity or to give the individual totals of the accelerations of a plurality of given different intensities.

The foregoing and other objects are obtained by the device illustrated in the accompanying drawings and described below. It is to be understood that the device is not limited to the specific form thereof disclosed herein.

Of the accompanying drawings,

Figure 2 is a vertical section taken on the line 2—2 of Figure 1;

Figure 1:
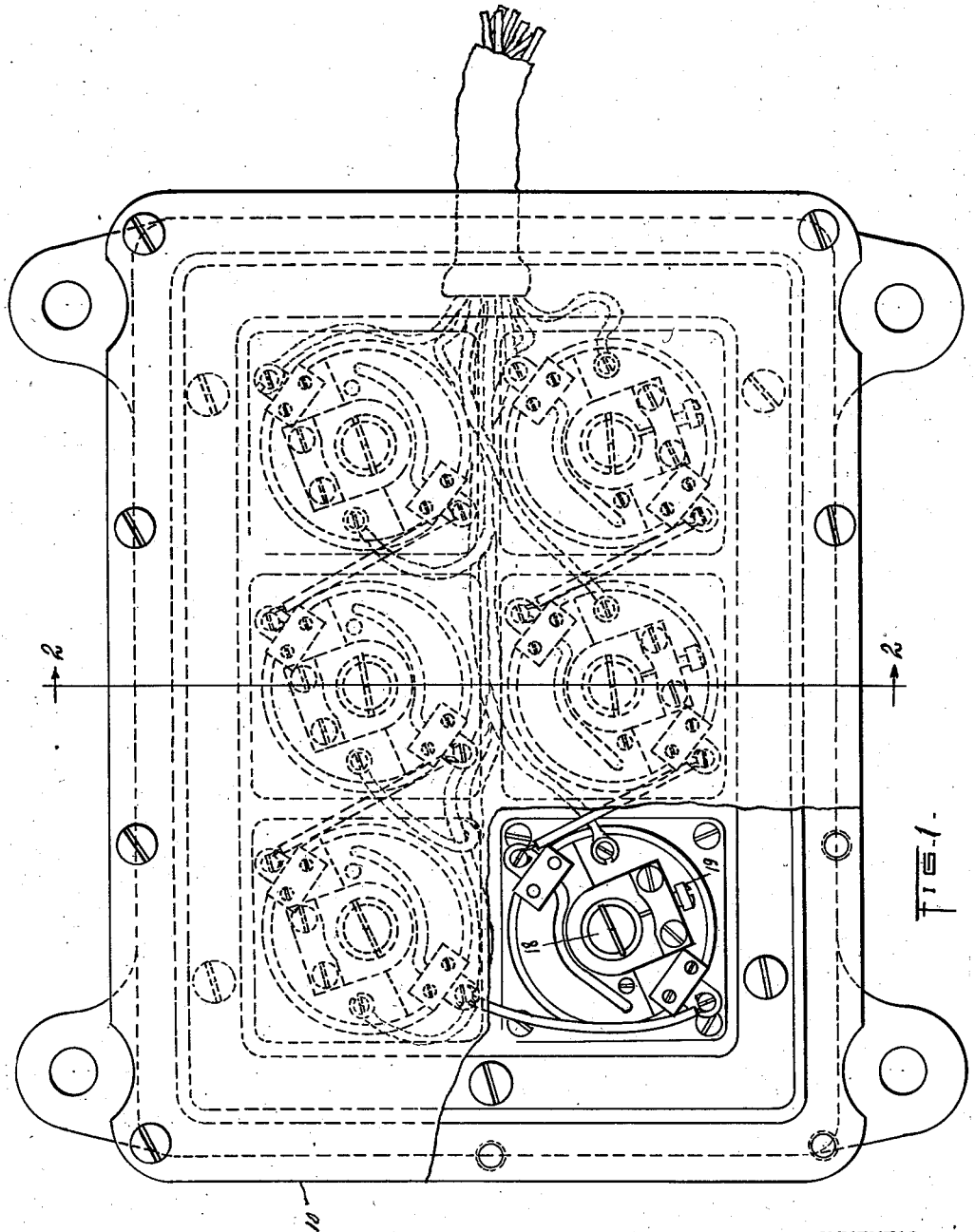
Figure 1 is a plan view of the contact element assembly of an accelerometer embodying the principles of the invention.

Figure 2ª is a vertical section of a contact element of an accelerometer embodying a modified form of the invention.

Figure 3 is a front perspective view of the registering or counting mechanism of the accelerometer;

Figure 4 is a rear elevation of the register with the back of the casing removed to expose the working parts;

Figure 5 is an enlarged scale plan detail of the counter mechanism;

Figure 6 is a vertical sectional detail taken on the line 6—6 of Figure 5;

Figure 7 is a side elevation of a Wheatstone bridge unit incorporated in the invention;

Figure 8 is a wiring diagram of one set of the elements of the instrument; and

Figure 9 is a graphical representation illustrative of the results obtained by the instrument.

Referring in detail to the drawings, the numeral 10 denotes a casing adapted to be attached to the body, the accelerations of which are to be measured. The casing is provided with a cover 11 and has clamped within its interior a base 12 carrying one or more solenoids 13, each enclosed in an iron casing 14. Each solenoid is provided with a central cylindrical passage 15 in which a weighted armature 16 is adapted to reciprocate. A cover plate 17 for each solenoid has threaded therein a graduated micrometer screw 18 adapted to be locked in a desired position by means of set screw 19 and provided at its lower end with an electrical contact point 20 adapted to contact with a similar point 21 projecting from the top of armature 16. The lower limit of reciprocation of the armature is determined by a screw plug 22 engageable with the bottom of the armature. The screw plug 22 is locked in the desired position by a set screw 23. The armature 16 is guided in its movement by means of a flange 24 projecting from the top of the armature and by means of a cantilever spring 25 connected to base 12 and affixed to a stem 26 projecting from the bottom of the armature. The spring also serves as an electrical connection to lower contact point 21. It will be apparent that in certain applications of the device it may be desirable to support both ends of the armature 16 by cantilever springs. In this modified form of the invention the armature is also supported at its upper end by a cantilever spring 25ª.

In Figure 7 is shown a Wheatstone bridge unit 27 which is normally made up of three resistance windings 28, 29 and 30.

The registering device includes a magnet 32 preferably of the permanent type which is provided with laminated pole pieces 33 which are adapted to closely surround and support coils 34. Pivotally mounted preferably on jeweled bearings 35 is a laminated armature 36, formed with an extending arm 37 which is pivotally connected as at 38 with a pallet bar 39 which controls the movement of escapement wheel 40. The escapement wheel 40 is incorporated in any standard numerical register 31 so that upon one escapement of the wheel 40 the register will register once.

The register 31 may be spring driven and wound by a key 41. For compactness and convenience all of the apparatus with the exception of the accelerometer units are mounted in a case 60. This apparatus includes on and off switches 44, a voltmeter 45, an ammeter 46, a reversing switch 47, a rheostat 48 having a sliding contact operated by a key 48ᵃ and double jacks 49.

Figure 8 illustrates the manner in which one set of the various instruments are connected. At 42 and 43 are shown leads to a suitable source of electric power preferably 6 volts direct current. The on and off switches 44 are usually employed in the power leads. For testing purposes a double jack 49 may be placed in the circuit as shown. When the jack is employed a resistance unit 50 is placed across the inner poles of the double jack. Ear phones, a galvanometer or the like may be plugged into the jack for testing. The resistance 50 approximates the resistance of the testing device.

For the sake of simplicity of explaining the operation of the device only one accelerometer unit with the cooperating registering instrument will be taken as shown in Figure 8.

The accelerometer unit is securely fastened to any member such as an axle, frame, spring or the like in which it is desired to measure the shocks or accelerations. The case 60 is placed at any distance from the accelerometer unit as long as wires can connect the two. The case 60 is also placed in as shock-proof a place as possible, although the instruments therein are fairly rugged. The solenoid 13 of the accelerometer unit is energized by closing the switch 44 in the leads 42, whereupon the rheostat 48 is adjusted so as to pass a substantial current through the solenoid 13. After passing a substantial current through the solenoid in one direction for a short period the adjusting means 48ᵃ of the rheostat is moved to cut down the amount of current passing through the solenoid and the reversing switch 47 is thrown to pass the current through the solenoid in the opposite direction.

Passing a substantial amount of current through the solenoid for a short period in the opposite direction from that at which the solenoid is normally operated wipes out or does away with any residual magnetism in the solenoid 13 or the armature 16.

The rheostat 48 is now adjusted to pass a predetermined amount of current through the solenoid 13 which tends to hold the contact points 20 and 21 together with a certain degree of force, dependent of course upon the amount of current passed through the solenoid and upon the size of the solenoid.

The switch 44 in the leads 43 is closed and current is supplied to opposite ends of the Wheatstone bridge 27. Now as long as the movements of the body or member to which the accelerometer unit is attached stay below a certain acceleration the contact points 20 and 21 in the accelerometer unit will stay together and as long as they stay together current will flow across the midpoints of the Wheatstone bridge in one direction, due to the unbalanced resistances. This current will energize the coils 34 in the registering device which will magnetize the laminated armature 36 and form oppositely charged poles at the ends thereof. The magnet 32 and the pole pieces 33 will then cooperate with the magnetized armature 36 to turn and hold it at the extent of its movement in one direction. However, when the acceleration imparted to the member to which the accelerometer is attached goes above a determined limit the inertia of the armature 16 in the accelerometer causes the contacting points 20 and 21 to pull apart. When this occurs the conditions in the Wheatstone bridge are entirely changed and current will flow through the coils 34 of the register in the opposite direction which will change the polarity of the armature 36 and cause it to swing back the extent of its movement in the other direction where it will be held until the contact points 20 and 21 come together again.

The points will come together as soon as the acceleration has dropped below that which it is desired to register whereupon the solenoid 13 will draw the armature 16 back up to contact the points. As soon as the points have again contacted the current is reversed in the coils 34 and the armature 36 is swung back to its original position. The back and forth movement of the armature 36 rocks the pallet bar 39 and allows the wheel 40 to escape once, thus registering one acceleration of a certain intensity upon the dial of the register 31.

It will thus be seen that by incorporating a plurality of accelerometer units in which the solenoids are of stepped strength in a single casing as in Figure 1 and then providing a plurality of registers, it is possible to measure the number of accelerations occurring between a plurality of definite accelerations simultaneously.

These data may be very helpful in many ways. For example as graphically shown in Figure 9 tests were run on the same pneumatic tire inflated with 29 and 34 pounds per square inch of air pressure. Four accelerometer units were mounted on the axle of a car adjacent the tire to be tested. The solenoids of the accelerometer units were constructed of varying number of turns of wire which were carefully determined so that one of the armatures 16 would pull its contacts 20 and 21 apart when the unit was subjected to an acceleration of fifty feet per second per second. The next unit was set to open at 100 feet per second per second, the next at 150 and the last at 200. The acceleration at which the contact points 20 and 21 open is thus controlled primarily by the number of turns of wire on the solenoid and by the current flowing therethrough. However, by means of the micrometer screw 18 the tension in the cantilever spring 25 can be controlled as can the position of the armature 16 in the solenoid, thus giving a final adjustment for the accleration required to pull the contacting points apart.

One of the features of this type of accelerometer is the feasibility of absolute calibration by using dead weights. The weight equivalent to a certain acceleration can be calculated and readily attached below the armature 16 of the unit.

The tire was inflated to 29 pounds pressure per square inch and the automobile driven over a mile course. In the actual test the register of the two hundred feet per second per second accelerometer read 10 which was marked down on the graph as shown. The register of the one hundred fifty feet per second per second accelerometer read two hundred fifty. Then taking 10 from 250 due to the fact that the accelerations over 200 feet per second per second would also be registered on the 150 feet per second per second accelerometer, it is found that 240 accelerations between 150 feet per second per second and 200 feet per second per second have occurred. Since the greater number of accelerations occur at the lower end of this scale, the mean average acceleration is taken to be 160 feet per second per second of which 240 have occurred, thus locating a second point on the graph. The 100 feet per second per second accelerometer has simultaneously registered 830 accelerations, however 250 of these lie above 150 feet per second per second, hence 830 minus 250 equals 580 accelerations which lie between 100 feet per second per second and 150 feet per second per second, or taking the average as 115 feet per second per second a third point is obtained for the graph. The remaining point is determined in a like manner, whereupon the car is returned to the starting point and the tire inflated to 34 pounds per square inch pressure and the run repeated. This time, however, the number of accelerations will be increased throughout as shown by the graph, thus proving the superior riding qualities of the tire inflated at 29 pounds. Obviously the tests could be extended to include various types and conditions of roads, driving speeds, vehicle loads, spring suspension and numerous other conditions that obtain in actual service. It is quite probable that many applications will suggest themselves to those who desire to measure vibrations.

It will be evident that one or a plurality of accelerometers can be employed. They can be placed horizontally, vertically or at any angle, a correction factor being used to compensate for the variation due to gravity. They can be adjusted to open at any desired acceleration. The apparatus is sufficiently sensitive to register as high as 60 accelerations per second and yet the accelerometer units are rugged enough to withstand shocks and accelerations far above that for which they are calibrated.

In former contact type accelerometers the weight was supported by a spring or air pressure. Replacing the spring or air pressure with a solenoid resulted in the elimination of contact chatter, this desirable condition being a result of the inverse load-position characteristics of an iron core in a solenoid. That is, the force tending to hold the contacts together decreases very rapidly with slight downward movement of the solenoid, hence, when an acceleration is reached which is sufficient to start motion of the core downward the movement is propagated by the rapidly decreasing restraining force, thus eliminating contact chatter. The screw plug 22 is normally run up within a few thousandths of an inch of the armature 16 so as to prevent any excessive movement thereof and to assist in quickly closing the contacting points when the acceleration has dropped below the actuating point.

The embodiment of the invention disclosed herein is to be taken in a descriptive and not a limiting sense, accordingly various modifications of the invention may be resorted to without departing from the spirit of the invention or the scope of the appended claims.

What is claimed is:

1. In combination in a shock measuring device, a main support, a solenoid on said support, an armature, means for supporting said armature against lateral movement in said solenoid, said means yieldingly permitting a limited longitudinal movement of said armature, a contacting point on the armature, a stationary contacting point mounted on said main support in fixed relation with said solenoid, and means for energizing said solenoid whereby said armature will be supported against the action of gravity by said solenoid and said contacting points are normally held together by the solenoid but are adapted to be pulled apart by the inertia of said armature against the action of said solenoid when the unit is subjected to a greater than a predetermined acceleration.

2. In combination in a shock measuring device, a main supporting structure, a solenoid mounted thereon, an armature within said solenoid, means supporting said armature in said solenoid permitting limited axial movement of the solenoid while restraining it against lateral movement, a contacting point on the armature, a mating contacting point fixed in relation with the solenoid, and means for energizing said solenoid whereby said contacting points are normally held together by said solenoid but are adapted to be pulled apart by the inertia of said armature against the action of said solenoid when the unit is subjected to a greater than a predetermined acceleration.

3. In combination in a shock measuring device, a main support, a solenoid thereon, an armature in said solenoid, means including a spring for supporting said armature against lateral movement in said solenoid while permitting limited axial movement of said armature, a contacting point on the armature, a stationary mating contacting point fixed with respect to the solenoid, a micrometer screw for adjusting the position of the stationary contact point, and means for energizing said solenoid, whereby said armature is supported against the action of gravity by said solenoid and said contacting points are normally held together by said solenoid but are adapted to be pulled apart by the inertia of said armature against the action of said solenoid when the unit is subjected to a greater than a predetermined acceleration.

4. An accelerometer comprising a solenoid, an armature, a support on which said solenoid and armature are mounted, guiding and supporting means mounting said armature on said support for preventing lateral movement of said armature and allowing limited longitudinal movement thereof, a contacting point on the armature, a mating contacting point on said support, and means for energizing said solenoid whereby said contacting points are normally held together by said solenoid but are adapted to be pulled apart by the inertia of said armature against the action of said solenoid when the unit is subjected to a greater than a predetermined acceleration.

5. In combination in a shock measuring device, a solenoid, an armature, a support on which said solenoid and armature are mounted, means for supporting said armature against lateral movement in said solenoid, said means permitting slight longitudinal movement thereof a contacting point on the armature, and a mating contacting point including means for mounting it in fixed relation with the armature, means for energizing said solenoid whereby said contacting points are normally held together but are adapted to be pulled apart by the inertia of said armature against the action of said solenoid when the unit is subjected to a greater than a predetermined acceleration, said solenoid remaining energized when said contacts are pulled apart, whereby said armature will return to its normal position bringing the contact points together when the acceleration is diminished to less than the predetermined acceleration.

6. In combination in a shock measuring device, a solenoid, an armature, a support on which said solenoid and armature are mounted, cantilever spring means for supporting said armature against lateral movement in said solenoid, said means permitting slight longitudinal movement thereof a contacting point on the armature, and a mating contacting point including means for mounting it in fixed relation with the armature, means for energizing said solenoid whereby said contacting points are normally held together but are adapted to be pulled apart by the inertia of said armature against the action of said solenoid when the unit is subjected to a greater than a predetermined acceleration.

ROY W. BROWN.